United States Patent
Washizu

(10) Patent No.: US 12,139,612 B2
(45) Date of Patent: Nov. 12, 2024

(54) RUBBER COMPOSITION AND TIRE

(71) Applicant: Sumitomo Rubber Industries, Ltd., Hyogo (JP)

(72) Inventor: Kensuke Washizu, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 534 days.

(21) Appl. No.: 17/615,150

(22) PCT Filed: May 15, 2020

(86) PCT No.: PCT/JP2020/019428
§ 371 (c)(1),
(2) Date: Nov. 30, 2021

(87) PCT Pub. No.: WO2020/246218
PCT Pub. Date: Dec. 10, 2020

(65) Prior Publication Data
US 2022/0235209 A1   Jul. 28, 2022

(30) Foreign Application Priority Data
Jun. 4, 2019   (JP) ................. 2019-104592

(51) Int. Cl.
C08L 9/06 (2006.01)
B60C 1/00 (2006.01)
B60C 11/00 (2006.01)
B60C 11/03 (2006.01)

(52) U.S. Cl.
CPC ............. *C08L 9/06* (2013.01); *B60C 1/0016* (2013.01); *B60C 11/0008* (2013.01); *B60C 11/033* (2013.01); *B60C 2011/0025* (2013.01); *B60C 2011/0033* (2013.01); *B60C 2011/0341* (2013.01); *C08L 2205/035* (2013.01)

(58) Field of Classification Search
CPC ... C08L 9/06; B60C 11/03; B60C 1/00; B60C 11/00
USPC ....................................... 524/492
See application file for complete search history.

(56) References Cited

U.S. PATENT DOCUMENTS

| | | | |
|---|---|---|---|
| 6,075,092 A | 6/2000 | Nakamura et al. | |
| 6,255,446 B1 | 7/2001 | Nakamura et al. | |
| 2003/0004249 A1 | 1/2003 | Yagi et al. | |
| 2005/0215692 A1* | 9/2005 | Hochi | C08K 3/346 |
| | | | 524/496 |
| 2010/0099810 A1 | 4/2010 | Nishioka et al. | |
| 2010/0130663 A1 | 5/2010 | Taguchi et al. | |
| 2015/0355571 A1 | 12/2015 | Mizumoto et al. | |
| 2016/0122517 A1 | 5/2016 | Tokimune et al. | |
| 2017/0015812 A1 | 1/2017 | Miyazaki et al. | |
| 2018/0346694 A1 | 12/2018 | Fukunishi et al. | |

FOREIGN PATENT DOCUMENTS

| | | |
|---|---|---|
| CN | 105283500 A | 1/2016 |
| CN | 106133047 A | 11/2016 |
| EP | 0779330 A1 | 6/1997 |
| JP | 2000-239445 A | 9/2000 |
| JP | 2003-128839 A | 5/2003 |
| JP | 2005-171095 A | 6/2005 |
| JP | 2006-213864 A | 8/2006 |
| JP | 2008-285524 A | 11/2008 |
| JP | 2015-074698 A | 4/2015 |
| JP | 2016-125000 A | 7/2016 |
| JP | 2017-110070 A | 6/2017 |
| WO | 97/39055 A1 | 10/1997 |

OTHER PUBLICATIONS

International Search Report issued in PCT/JP2020/019428; mailed Jul. 14, 2020.

* cited by examiner

*Primary Examiner* — Deve V Hall
(74) *Attorney, Agent, or Firm* — Studebaker & Brackett PC

(57) ABSTRACT

The present disclosure aims to provide rubber compositions and tires which provide improved overall performance in terms of wet grip performance and dry grip performance. The present disclosure relates to a rubber composition having a hardness that reversibly changes with water and satisfying the following relationships (1) and (2): Hardness when dry−Hardness when water-wet≥1 (1) wherein each hardness represents the JIS-A hardness at 25° C. of the rubber composition; and tan δ at 70° C. when dry≥0.18 (2) wherein the tan δ at 70° C. represents the loss tangent measured at 70° C., an initial strain of 10%, a dynamic strain of 2%, and a frequency of 10 Hz.

15 Claims, No Drawings

RUBBER COMPOSITION AND TIRE

TECHNICAL FIELD

The present disclosure relates to rubber compositions and tires.

BACKGROUND ART

In recent years, safety has become an increasingly important issue for all automobiles. This has created a need for further improving wet grip performance. To date, various studies have been made to improve wet grip performance, and many inventions directed to silica-containing rubber compositions have been reported (for example, Patent Literature 1). Wet grip performance can be greatly affected particularly by the properties of the rubber composition of the tread portion that contacts the road. Thus, a variety of technical improvements in rubber compositions for tire applications such as treads have been proposed and put into practical use.

CITATION LIST

Patent Literature

Patent Literature 1: JP 2008-285524 A

SUMMARY OF INVENTION

Technical Problem

As a result of extensive studies, the present inventor has found that, although the wet grip performance of tires has greatly advanced with the technical improvements of silica-containing rubber compositions for treads, there still remains the major technical problem of changes in grip performance caused by, for example, changes in road conditions from dry to wet road, or from wet to dry road, and thus room for improvement exists.

The inventor has extensively investigated this problem and found that when conventional rubber compounds change from a dry state where they are not wet with water to a so-called wet state where they are wet with water, they will not change in hardness or will become harder due to cooling with water. Thus, the road contact area may be reduced and therefore the wet grip performance tends to be reduced compared to the dry grip performance.

Hence, it has been found that the conventional techniques leave room for improvement to improve overall performance in terms of wet grip performance and dry grip performance.

The present disclosure aims to solve the problem and provide rubber compositions and tires which provide improved overall performance in terms of wet grip performance and dry grip performance.

Solution to Problem

The present disclosure relates to a rubber composition, having a hardness that reversibly changes with water and satisfying the following relationships (1) and (2):

Hardness when dry−Hardness when water-wet≥1  (1)

wherein each hardness represents a JIS-A hardness at 25° C. of the rubber composition; and tan δ at 70° C. when dry≥0.18  (2)

wherein the tan δ at 70° C. represents a loss tangent measured at 70° C., an initial strain of 10%, a dynamic strain of 2%, and a frequency of 10 Hz.

The value of "Hardness when dry−Hardness when water-wet" in relationship (1) is preferably 2 or more, more preferably 3 or more, still more preferably 4 or more.

The value of "tan δ at 70° C. when dry" in relationship (2) is preferably 0.19 or more, more preferably 0.20 or more, still more preferably 0.21 or more.

The rubber composition preferably contains at least one hydrophilic material.

The rubber composition preferably contains at least one diene rubber and at least one polymer having a carbon-carbon double bond and a heteroatom.

The heteroatom is preferably at least one atom selected from the group consisting of an oxygen atom, a nitrogen atom, a silicon atom, a sulfur atom, a phosphorus atom, and a halogen atom.

The polymer preferably contains at least 5% by mass of insolubles when suspended in an amount of 1 g per 10 mL of water.

The polymer preferably contains at least 5% by mass of insolubles when suspended in an amount of 1 g per 10 mL of tetrahydrofuran.

The rubber composition preferably contains, per 100 parts by mass of the at least one rubber component therein, at least 5 parts by mass of the polymer.

The rubber composition preferably contains at least one isoprene-based rubber.

The rubber composition preferably contains at least one polybutadiene rubber.

The rubber composition preferably has a styrene-butadiene rubber content of 95% by mass or lower based on 100% by mass of the at least one rubber component in the rubber composition.

The rubber composition preferably satisfies the following relationship:

Styrene-butadiene rubber content based on 100% by mass of rubber components>50% by mass>Polybutadiene rubber content based on 100% by mass of rubber components>Isoprene-based rubber content based on 100% by mass of rubber components.

The rubber composition preferably contains silica and carbon black each in an amount of 20 parts by mass or more per 100 parts by mass of the at least one rubber component in the rubber composition.

The rubber composition preferably contains at least one petroleum resin.

The rubber composition is preferably for use in a tread.

The present disclosure also relates to a tire, including a tire component at least partially including the rubber composition.

The tire component is preferably a tread.

Preferably, the tire component is a tread, and the tread has a thickness of 4 mm or more.

Preferably, the tire component is a tread, and the tread has a land ratio of 30% or higher.

Preferably, the tire component is a tread, and the tread includes at least one of a groove that is continuous in a tire circumferential direction or a groove that is non-continuous in the tire circumferential direction.

Advantageous Effects of Invention

The rubber composition of the present disclosure has a hardness that reversibly changes with water, and satisfies relationships (1) and (2). Such a rubber composition provides improved overall performance in terms of wet grip performance and dry grip performance.

DESCRIPTION OF EMBODIMENTS

The rubber composition of the present disclosure has a hardness that reversibly changes with water, and satisfies the relationships (1) and (2) below. Thus, the rubber composition provides improved overall performance in terms of wet grip performance and dry grip performance.

Hardness when dry−Hardness when water-wet≥1     (1)

In the relationship, each hardness represents the JIS-A hardness at 25° C. of the rubber composition.

tan δ at 70° C. when dry≥0.18     (2)

In the relationship, the tan δ at 70° C. represents the loss tangent measured at 70° C., an initial strain of 10%, a dynamic strain of 2%, and a frequency of 10 Hz.

The rubber composition provides the above-mentioned effect. The reason for this advantageous effect is not exactly clear, but may be explained as follows.

The rubber composition of the present disclosure has a hardness that reversibly changes with water, and satisfies relationship (1). The relationship (1) indicates that the hardness when water-wet is lower than the hardness when dry. In other words, by "the rubber composition of the present disclosure has a hardness that reversibly changes with water, and satisfies relationship (1)", it is meant that the rubber composition has a hardness which is lower when water-wet than when dry and which reversibly changes in the presence of water.

Accordingly, when the road conditions change from dry to wet, the rubber composition gets wet with water and thereby has a reduced hardness, which makes it possible to reduce a decrease in grip performance (wet grip performance), resulting in good grip performance (wet grip performance). This is believed to be because if the hardness remains suitable for dry roads, sufficient grip performance cannot be obtained on wet roads where skidding is more likely to occur; in contrast, a reduced hardness leads to an increased road contact area, which makes it possible to reduce a decrease in grip performance (wet grip performance), resulting in good grip performance (wet grip performance).

On the other hand, when the road conditions change from wet to dry, the water-wet rubber composition gets dry and thereby has an increased hardness, which makes it possible to reduce a decrease in grip performance (dry grip performance), resulting in good grip performance (dry grip performance). This is believed to be because if the hardness remains suitable for wet roads, sufficient grip performance cannot be obtained on dry roads where skidding is less likely to occur; in contrast, an increased hardness, which is suitable for dry roads, makes it possible to reduce a decrease in grip performance (dry grip performance), resulting in good grip performance (dry grip performance).

Thus, a rubber composition having a hardness that reversibly changes with water, and further satisfying relationship (1) provides an appropriate hardness depending on the water conditions on the road (wet or dry road), and therefore provides improved overall performance in terms of wet grip performance and dry grip performance.

Moreover, the rubber composition of the present disclosure provides better wet grip performance and dry grip performance by satisfying relationship (2).

Therefore, the rubber composition of the present disclosure having a hardness that reversibly changes with water and satisfying relationships (1) and (2) provides improved overall performance in terms of wet grip performance and dry grip performance.

As described, the present disclosure solves the problem (purpose) of improving overall performance in terms of wet grip performance and dry grip performance by formulating a rubber composition satisfying the parameters of relationships (1) and (2). In other words, the parameters do not define the problem (purpose), and the problem herein is to improve overall performance in terms of wet grip performance and dry grip performance. In order to provide a solution to this problem, a rubber composition satisfying the parameters of relationships (1) and (2) has been formulated. Thus, it is an essential feature to satisfy the parameters of relationships (1) and (2).

Herein, the hardness and tan δ of the rubber composition refer to the hardness and tan δ, respectively, of the rubber composition having been vulcanized. Moreover, the tan δ is determined by subjecting the vulcanized rubber composition to a viscoelastic test.

Herein, the phrase "hardness that reversibly changes with water" means that the hardness of the (vulcanized) rubber composition reversibly increases or decreases depending on the presence of water. Here, it is sufficient that the hardness reversibly change when the state of the rubber composition changes, for example, as follows: dry→water-wet→dry. The rubber composition in the former dry state may or may not have the same hardness as in the latter dry state.

Herein, the term "hardness when dry" refers to the hardness of the (vulcanized) rubber composition in the dry state, and specifically refers to the hardness of the (vulcanized) rubber composition which has been dried by the method described in EXAMPLES.

Herein, the term "hardness when water-wet" refers to the hardness of the (vulcanized) rubber composition in the water-wet state, and specifically refers to the hardness of the (vulcanized) rubber composition which has been wetted with water by the method described in EXAMPLES.

Herein, the hardness (JIS-A hardness) of the (vulcanized) rubber composition is measured at 25° C. using a type A durometer in accordance with JIS K6253-3 (2012) "Rubber, vulcanized or thermoplastic—Determination of hardness—Part 3: Durometer method".

Herein, the term "tan δ at 70° C. when dry" refers to the tan δ at 70° C. of the (vulcanized) rubber composition in the dry state, and specifically refers to the tan δ at 70° C. of the (vulcanized) rubber composition which has been dried by the method described in EXAMPLES.

Herein, the tan δ at 70° C. of the (vulcanized) rubber composition represents the loss tangent measured at 70° C., an initial strain of 10%, a dynamic strain of 2%, and a frequency of 10 Hz.

As shown in relationship (1), the value of "Hardness when dry−Hardness when water-wet" [(the hardness of the (vulcanized) rubber composition in the dry state)−(the hardness of the (vulcanized) rubber composition in the water-wet state)] is 1 or more, preferably 2 or more, more preferably 3 or more, still more preferably 4 or more, particularly preferably 5 or more, most preferably 6 or more, further preferably 8 or more, further preferably 9 or more, further preferably 10 or more, further preferably 11 or more, further preferably 13 or more, further preferably 15 or more, further preferably 18 or more, further preferably 21 or more, further preferably 24 or more. The upper limit is not limited, but it is preferably 50 or less, more preferably 40 or less, still more preferably 30 or less, particularly preferably 28 or less, most preferably 26 or less. When the value is within the range indicated above, the advantageous effect can be more suitably achieved.

The "Hardness when dry" (the hardness of the (vulcanized) rubber composition in the dry state) may be appropriately controlled within the range satisfying relationship (1). It is preferably 20 or more, more preferably 25 or more, still more preferably 30 or more, particularly preferably 40 or more, most preferably 50 or more, further preferably 55 or more, further preferably 58 or more, further preferably 62 or more, further preferably 64 or more, but is preferably 95 or less, more preferably 90 or less, still more preferably 85 or less, particularly preferably 75 or less, most preferably 70 or less, further preferably 66 or less, further preferably 65 or less. When the hardness is within the range indicated above, the advantageous effect can be more suitably achieved.

The "Hardness when water-wet" (the hardness of the (vulcanized) rubber composition in the water-wet state) may be appropriately controlled within the range satisfying relationship (1). It is preferably 20 or more, more preferably 25 or more, still more preferably 30 or more, particularly preferably 35 or more, most preferably 40 or more, further preferably 43 or more, further preferably 45 or more, further preferably 46 or more, further preferably 49 or more, further preferably 50 or more, further preferably 51 or more, further preferably 53 or more, further preferably 55 or more, but is preferably 80 or less, more preferably 70 or less, still more preferably 65 or less, even more preferably 62 or less, particularly preferably 61 or less, most preferably 60 or less, further preferably 59 or less, further preferably 56 or less. When the hardness is within the range indicated above, the advantageous effect can be more suitably achieved.

As shown in relationship (2), the "tan δ at 70° C. when dry" (the tan δ at 70° C. of the (vulcanized) rubber composition in the dry state) is 0.18 or more, preferably 0.19 or more, more preferably 0.20 or more, still more preferably 0.21 or more, particularly preferably 0.22 or more, most preferably 0.23 or more. The upper limit is not limited, but it is preferably 0.60 or less, more preferably 0.40 or less, still more preferably 0.30 or less, particularly preferably 0.25 or less. When the tan δ is within the range indicated above, the advantageous effect can be more suitably achieved.

A rubber composition having a hardness which changes as shown in relationship (1) and which reversibly changes with water may be achieved by incorporating a hydrophilic material, specifically a compound capable of forming a reversible molecular bond (e.g., a hydrogen bond or an ionic bond) with water.

The hydrophilic material may be any compound capable of forming a reversible molecular bond (e.g., a hydrogen bond or an ionic bond) with water, including, for example, heteroatom-containing compounds.

The production guideline for satisfying the above parameters will be more specifically described below. When a rubber composition contains a combination of at least one rubber component including a diene rubber with a polymer having a carbon-carbon double bond and a heteroatom, it achieves a hardness which changes as shown in relationship (1) and which reversibly changes with water.

This is because the heteroatom can form a reversible molecular bond (e.g., a hydrogen bond or an ionic bond) with water in the rubber composition, as a result of which the hardness of the rubber composition in the water-wet state is reduced.

Moreover, owing to the combination, the polymer is crosslinked and fixed via its carbon-carbon double bond to the rubber component during vulcanization. This makes it possible to suppress release of the polymer from the rubber component, thereby suppressing precipitation of the polymer on the rubber surface. Thus, a decrease in grip performance (wet grip performance, dry grip performance) can also be reduced.

Moreover, the tan δ at 70° C. when dry can be controlled by the types and amounts of the chemicals (in particular, rubber components, fillers, softeners, resins, sulfur, vulcanization accelerators, silane coupling agents) incorporated in the rubber composition. For example, the tan δ at 70° C. tends to be increased by using a softener (e.g., resin) having low compatibility with the rubber components, or by using an unmodified rubber, or by increasing the amount of fillers, or by increasing the amount of oils as plasticizers, or by reducing the amount of sulfur, or by reducing the amount of vulcanization accelerators, or by reducing the amount of silane coupling agents.

Moreover, the hardness when dry can be controlled by the types and amounts of the chemicals (in particular, rubber components, fillers, softeners such as oils and resins) incorporated in the rubber composition. For example, the hardness when dry tends to be reduced by increasing the amount of softeners; the hardness when dry tends to be increased by increasing the amount of fillers; and the hardness when dry tends to be reduced by decreasing the amount of sulfur. The hardness when dry can also be controlled by varying the amounts of sulfur and vulcanization accelerators. More specifically, increasing the amount of sulfur tends to increase the hardness when dry; and increasing the amount of vulcanization accelerators tends to increase the hardness when dry.

More specifically, when the hardness when dry is controlled within the desired range, and further a hydrophilic material, preferably a combination of at least one rubber component including a diene rubber with a polymer having a carbon-carbon double bond and a heteroatom, is incorporated, the rubber composition achieves a hardness which changes as shown in relationship (1) and which reversibly changes with water, and at the same time the tan δ at 70° C. when dry can be adjusted within the desired range. Moreover, the amount of fillers may be increased in order to increase the tan δ at 70° C. when dry.

As another means for allowing a rubber composition to achieve a hardness which changes as shown in relationship (1) and which reversibly changes with water, when a rubber composition contains a combination of at least one rubber component including a diene rubber with a polymer having a carbon-carbon double bond and a heteroatom, the polymer is crosslinked and fixed via its carbon-carbon double bond to the rubber component during vulcanization. This makes it possible to suppress release of the polymer from the rubber component, so that the rubber composition achieves a hardness which changes as shown in relationship (1) and which reversibly changes with water.

If the polymer has no carbon-carbon double bond, it may be released into water when the rubber composition comes in contact with water, and therefore reversible changes in hardness may not occur.

Moreover, another means for allowing a rubber composition to achieve a hardness which changes as shown in relationship (1) and which reversibly changes with water is, for example, to reversibly break or re-form the ionic bond between the rubber molecules through addition of water or drying. More specifically, when a rubber composition contains a combination of a rubber containing a halogen or oxygen with a compound containing a metal, metalloid, or nitrogen, it achieves a hardness which changes as shown in relationship (1) and which reversibly changes with water.

This is because, owing to the combination, the cation derived from the metal, metalloid, or nitrogen and the anion derived from the halogen or oxygen form an ionic bond between the rubber molecules, which is then cleaved by addition of water and re-formed by drying of water, with the result that the hardness decreases when water-wet and increases when dry.

Chemicals that may be used are described below.

Examples of rubber components include diene rubbers such as isoprene-based rubbers, polybutadiene rubbers (BR), styrene-butadiene rubbers (SBR), styrene-isoprene-butadiene rubbers (SIBR), acrylonitrile-butadiene rubbers (NBR), chloroprene rubbers (CR), and butyl rubbers (IIR). The rubber components may be used alone or in combinations of two or more. Among these, diene rubbers are preferred, isoprene-based rubbers, BR, and SBR are more preferred, and SBR is still more preferred. Combinations of isoprene-based rubbers and SBR, combinations of BR and SBR, or combinations of isoprene-based rubbers, BR, and SBR are also preferred.

The rubber components preferably have a weight average molecular weight (Mw) of 150,000 or more, more preferably 350,000 or more. The upper limit of the Mw is not limited, but it is preferably 4,000,000 or less, more preferably 3,000,000 or less.

The amount of the diene rubbers based on 100% by mass of the rubber components is preferably 20% by mass or more, more preferably 50% by mass or more, still more preferably 70% by mass or more, particularly preferably 80% by mass or more, most preferably 90% by mass or more, and may be 100% by mass. When the amount is within the range indicated above, the advantageous effect tends to be better achieved.

Any SBR may be used. Examples include those commonly used in the tire industry, such as emulsion-polymerized SBR (E-SBR) and solution-polymerized SBR (S-SBR). These may be used alone or in combinations of two or more.

The styrene content of the SBR is preferably 10% by mass or higher, more preferably 15% by mass or higher, still more preferably 20% by mass or higher, but is preferably 50% by mass or lower, more preferably 40% by mass or lower, still more preferably 30% by mass or lower. When the styrene content is within the range indicated above, the advantageous effect tends to be more suitably achieved.

The vinyl content of the SBR is preferably 10% by mass or higher, more preferably 20% by mass or higher, still more preferably 30% by mass or higher, particularly preferably 40% by mass or higher, most preferably 50% by mass or higher, but is preferably 75% by mass or lower, more preferably 65% by mass or lower. The SBR having a vinyl content within the range indicated above tends to have good compatibility with BR, so that the advantageous effect tends to be more suitably achieved.

The SBR may be unmodified or modified SBR.

The modified SBR may be any SBR having a functional group interactive with a filler such as silica. Examples include a chain end-modified SBR obtained by modifying at least one chain end of SBR with a compound (modifier) having the functional group (i.e., a chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group, and at least one chain end is modified with the modifier); and a chain end-modified SBR in which a hydroxy or epoxy group has been introduced by modification (coupling) with a polyfunctional compound having two or more epoxy groups in the molecule. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted. Among these, amino (preferably amino whose hydrogen atom is replaced with a C1-C6 alkyl group), alkoxy (preferably C1-C6 alkoxy), alkoxysilyl (preferably C1-C6 alkoxysilyl), and amide groups are preferred.

SBR products manufactured or sold by Sumitomo Chemical Co., Ltd., JSR Corporation, Asahi Kasei Corporation, Zeon Corporation, etc. may be used as the SBR.

The amount of the SBR based on 100% by mass of the rubber components is preferably 20% by mass or more, more preferably 50% by mass or more, still more preferably 60% by mass or more, but is preferably 95% by mass or less, more preferably 90% by mass or less, still more preferably 80% by mass or less. When the amount is within the range indicated above, the advantageous effect tends to be better achieved.

Any BR may be used. Examples include those commonly used in the tire industry. These may be used alone or in combinations of two or more.

The cis content of the BR is preferably 90% by mass or higher, more preferably 95% by mass or higher, still more preferably 97% by mass or higher. The upper limit is not limited and may be 100% by mass. When the cis content is within the range indicated above, the advantageous effect tends to be more suitably achieved.

The BR may be unmodified or modified BR. Examples of the modified BR include those into which the above-mentioned functional groups are introduced. Preferred embodiments are as described for the modified SBR.

The BR may be commercially available from Ube Industries, Ltd., JSR Corporation, Asahi Kasei Corporation, Zeon Corporation, etc.

The amount of the BR based on 100% by mass of the rubber components is preferably 5% by mass or more, more preferably 10% by mass or more, but is preferably 70% by mass or less, more preferably 40% by mass or less, still more preferably 30% by mass or less. When the amount is within the range indicated above, the advantageous effect tends to be more suitably achieved.

Examples of the isoprene-based rubbers include natural rubbers (NR), polyisoprene rubbers (IR), refined NR, modified NR, and modified IR. The NR may be those commonly used in the tire industry such as SIR20, RSS #3, and TSR20. Any IR may be used, and examples include those commonly used in the tire industry such as IR2200. Examples of the refined NR include deproteinized natural rubbers (DPNR) and highly purified natural rubbers (UPNR). Examples of the modified NR include epoxidized natural rubbers (ENR), hydrogenated natural rubbers (HNR), and grafted natural rubbers. Examples of the modified IR include epoxidized polyisoprene rubbers, hydrogenated polyisoprene rubbers, and grafted polyisoprene rubbers. These may be used alone or in combinations of two or more. NR is preferred among these.

The amount of the isoprene-based rubbers based on 100% by mass of the rubber components is preferably 3% by mass or more, more preferably 5% by mass or more, but is preferably 60% by mass or less, more preferably 30% by mass or less, still more preferably 20% by mass or less. When the amount is within the range indicated above, the advantageous effect tends to be more suitably achieved.

The rubber composition preferably satisfies the following relationship:
Styrene-butadiene rubber content based on 100% by mass of rubber components>50% by mass>Polybutadiene rubber content based on 100% by mass of rubber components>Isoprene-based rubber content based on 100% by mass of rubber components. In this case, the advantageous effect tends to be more suitably achieved.

Herein, the weight average molecular weight (Mw) and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The cis content (cis-1,4-butadiene unit content) and vinyl content (1,2-butadiene unit content) can be measured by infrared absorption spectrometry. The styrene content can be measured by $^1$H-NMR analysis.

The rubber composition preferably contains one or more hydrophilic materials.

As described earlier, the hydrophilic materials may be any compound capable of forming a reversible molecular bond (e.g., a hydrogen bond or an ionic bond) with water, including, for example, heteroatom-containing compounds. Preferred among these are compounds having a carbon-carbon double bond and a heteroatom, with polymers having a carbon-carbon double bond and a heteroatom being more preferred.

The carbon-carbon double bond is necessary for cross-linking with a diene rubber. The number of such bonds is not limited.

The term "heteroatom" refers to an atom other than carbon and hydrogen atoms. It may be any heteroatom capable of forming a reversible molecular bond (e.g., a hydrogen bond or an ionic bond) with water. The heteroatom is preferably at least one atom selected from the group consisting of an oxygen atom, a nitrogen atom, a silicon atom, a sulfur atom, a phosphorus atom, and a halogen atom, more preferably an oxygen atom, a nitrogen atom, and/or a silicon atom, still more preferably an oxygen atom. Moreover, the heteroatom is preferably present in the main chain (backbone) of the polymer, more preferably in the repeating unit of the polymer.

Examples of structures or groups having an oxygen atom include ether, ester, carboxy, carbonyl, alkoxy, and hydroxy groups. Preferred among these are ether groups, with oxyalkylene groups being more preferred.

Examples of structures or groups having a nitrogen atom include amino (primary, secondary, and tertiary amino groups), amide, nitrile, and nitro groups. Preferred among these are amino groups, with tertiary amino groups being more preferred.

Examples of structures or groups having a silicon atom include silyl, alkoxysilyl, and silanol groups. Preferred among these are silyl groups, with alkoxysilyl groups being more preferred.

Examples of structures or groups having a sulfur atom include sulfide, sulfate, and sulfo groups, and sulfates.

Examples of structures or groups having a phosphorus atom include phosphate groups and phosphates.

Examples of structures or groups having halogen atoms include halogeno groups such as fluoro, chloro, bromo, and iodo groups.

The term "oxyalkylene group" refers to a group represented by —(AO)—, preferably a group represented by —(AO)$_n$— wherein n represents the number of repeating units.

The number of carbons in the alkylene group A of the oxyalkylene group AO is preferably 1 or more, more preferably 2 or more, but is preferably 10 or less, more preferably 8 or less, still more preferably 6 or less. When the number is within the range indicated above, the advantageous effect tends to be more suitably achieved.

The alkylene group A of the oxyalkylene group AO may be either linear or branched, but it is preferably branched to form a bulkier structure so that the advantageous effect can be more suitably achieved.

To more suitably achieve the advantageous effect, the AO is preferably a C2-C3 oxyalkylene group (an oxyethylene group (EO), an oxypropylene group (PO)) or a C2-C3 oxyalkylene group attached to a branched chain R$^4$ (R$^4$ represents a hydrocarbon group optionally having a heteroatom), more preferably a combination of a C2-C3 oxyalkylene group and a C2-C3 oxyalkylene group attached to a branched chain R$^4$. The branched chain R$^4$ is preferably attached to a carbon atom adjacent to the oxygen atom.

The hydrocarbon group optionally having a heteroatom as R$^4$ is not limited. The number of carbons in the hydrocarbon group is preferably 1 or more, more preferably 2 or more, but is preferably 10 or less, more preferably 6 or less, still more preferably 4 or less. When the number is within the range indicated above, the advantageous effect tends to be more suitably achieved.

A preferred example of the hydrocarbon group optionally having a heteroatom as R$^4$ is a group represented by the following formula.

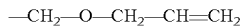

—CH$_2$—O—CH$_2$—CH═CH$_2$

The group represented by —(AO)— still more preferably includes a group represented by the following formula (B), particularly preferably groups represented by the following formulas (A) and (B), optionally in combination with a group represented by the following formula (C).

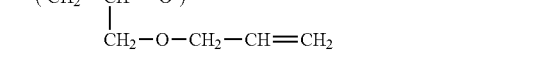

When the polymers have at least two types of oxyalkylene groups, the oxyalkylene groups may be arranged blockwise or randomly.

Preferred among the polymers are polymers having the group (structural unit) of formula (B), with polymers having the groups (structural units) of formulas (A) and (B) being more preferred.

The amount of the group (structural unit) of formula (B) based on 100 mol % of the polymers is preferably 2 mol % or more, more preferably 5 mol % or more, but is preferably 50 mol % or less, more preferably 40 mol % or less, still more preferably 30 mol % or less, particularly preferably 20 mol % or less.

The weight average molecular weight (Mw) of the polymers is preferably 10,000 or more, more preferably 50,000 or more, still more preferably 100,000 or more, particularly preferably 500,000 or more, but is preferably 3,000,000 or less, more preferably 2,500,000 or less, still more preferably 2,000,000 or less, particularly preferably 1,500,000 or less, most preferably 1,000,000 or less.

The polymers preferably contain at least 5% by mass, more preferably at least 10% by mass, still more preferably at least 30% by mass, particularly preferably at least 50% by mass, most preferably at least 70% by mass, still most preferably at least 80% by mass, further most preferably at least 90% by mass of insolubles (water-insolubles) when suspended in an amount of 1 g per 10 mL of water. The upper limit of the amount of such insolubles is not limited.

The amount of such insolubles can be measured as described in EXAMPLES.

A larger amount of such insolubles indicates that less dissolution of the polymers into water will occur when the rubber compound is wetted with water, and therefore reversible changes in hardness can be more suitably achieved.

The polymers preferably contain at least 5% by mass, more preferably at least 10% by mass, still more preferably at least 30% by mass, particularly preferably at least 50% by mass, most preferably at least 70% by mass, still most preferably at least 90% by mass of insolubles (THF-insolubles) when suspended in an amount of 1 g per 10 mL of tetrahydrofuran. The upper limit of the amount of such insolubles is not limited.

The amount of such insolubles can be measured as described in EXAMPLES.

Since diene rubbers are soluble in tetrahydrofuran, the polymers with a larger amount of insolubles in tetrahydrofuran have less compatibility with diene rubbers, and therefore the effect of decrease in hardness when water-wet tends to be sufficiently achieved.

The polymers may be commercial products. Alternatively, they may be prepared by polymerizing heteroatom-containing monomers.

Any heteroatom-containing monomer may be used. Examples of such monomers having an oxygen atom include ethers such as vinyl ethers, alkoxystyrenes, allyl glycidyl ether, ethylene oxide, propylene oxide, and tetrahydrofuran; (meth)acrylic acids and esters or acid anhydrides thereof. Examples of such monomers having a nitrogen atom include acrylonitrile, N-vinylcarbazole, carbamic acid, and caprolactam. Examples of such monomers having a silicon atom include alkoxysilylstyrenes and alkoxysilylvinyls.

When the heteroatom-containing monomers have no unsaturated bond, the heteroatom-containing monomers may be polymerized together with a monomer having a carbon-carbon double bond (for example, a conjugated diene monomer such as butadiene or isoprene, or a vinyl polymer such as styrene).

The polymerization may be performed by any method, including known methods.

The amount of the polymers per 100 parts by mass of the rubber components is preferably 5 parts by mass or more, more preferably 10 parts by mass or more, still more preferably 20 parts by mass or more, particularly preferably 30 parts by mass or more, most preferably 40 parts by mass or more, still most preferably 50 parts by mass or more, further most preferably 60 parts by mass or more, particularly most preferably 70 parts by mass or more, further preferably 80 parts by mass or more, further preferably 90 parts by mass or more, further preferably 100 parts by mass or more, but is preferably 150 parts by mass or less, more preferably 120 parts by mass or less. When the amount is within the range indicated above, the advantageous effect tends to be better achieved.

The rubber composition may contain one or more types of silica.

Examples of the silica include dry silica (silicic anhydride) and wet silica (hydrous silicic acid). Wet silica is preferred because it contains a large number of silanol groups. These may be used alone or in combinations of two or more.

The nitrogen adsorption specific surface area ($N_2SA$) of the silica is 40 $m^2/g$ or more, preferably 60 $m^2/g$ or more, more preferably 80 $m^2/g$ or more, still more preferably 160 $m^2/g$ or more. The $N_2SA$ is also preferably 600 $m^2/g$ or less, more preferably 300 $m^2/g$ or less, still more preferably 250 $m^2/g$ or less, particularly preferably 200 $m^2/g$ or less. When the $N_2SA$ is within the range indicated above, the advantageous effect tends to be more suitably achieved.

The $N_2SA$ of the silica is determined by a BET method in accordance with ASTM D3037-81.

The silica may be commercially available from Degussa, Rhodia, Tosoh Silica Corporation, Solvay Japan, Tokuyama Corporation, etc.

The amount of the silica per 100 parts by mass of the rubber components is preferably 5 parts by mass or more, more preferably 10 parts by mass or more, still more preferably 15 parts by mass or more, particularly preferably 20 parts by mass or more, most preferably 30 parts by mass or more, further preferably 50 parts by mass or more, further preferably 60 parts by mass or more, further preferably 70 parts by mass or more, but is preferably 150 parts by mass or less, more preferably 140 parts by mass or less, still more preferably 120 parts by mass or less, particularly preferably 100 parts by mass or less, most preferably 90 parts by mass or less. When the amount is within the range indicated above, the advantageous effect tends to be better achieved.

The amount of the silica based on 100% by mass of the fillers (reinforcing fillers) in the rubber composition is preferably 10% by mass or more, more preferably 20% by mass or more, still more preferably 30% by mass or more. The upper limit is not limited, but it is preferably 90% by mass or less, more preferably 70% by mass or less, still more preferably 60% by mass or less. When the amount is within the range indicated above, the advantageous effect tends to be more suitably achieved.

The rubber composition containing silica preferably further contains one or more silane coupling agents.

Any silane coupling agent may be used, and examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. For example, commercial products available from Degussa, Momentive, Shin-Etsu Silicone, Tokyo Chemical Industry Co., Ltd., AZmax. Co., Dow Corning Toray Co., Ltd., etc. may be used. These may be used alone or in combinations of two or more. Preferred among these are sulfide and mercapto silane coupling agents, with disulfide silane coupling agents having a disulfide bond such as bis(3-triethoxysilylpropyl)disulfide being more preferred, because then the advantageous effect tends to be better achieved.

The amount of the silane coupling agents per 100 parts by mass of the silica is preferably 3 parts by mass or more, more preferably 5 parts by mass or more, but is preferably 20 parts by mass or less, more preferably 15 parts by mass or less. When the amount is within the range indicated above, the advantageous effect tends to be better achieved.

The rubber composition may contain one or more types of carbon black.

Any carbon black may be used, and examples include N134, N110, N220, N234, N219, N339, N330, N326, N351, N550, and N762. These may be used alone or in combinations of two or more.

The nitrogen adsorption specific surface area ($N_2SA$) of the carbon black is preferably 80 $m^2/g$ or more, more preferably 100 $m^2/g$ or more, but is preferably 150 $m^2/g$ or less, more preferably 130 $m^2/g$ or less. When the $N_2SA$ is within the range indicated above, the advantageous effect tends to be better achieved.

Herein, the $N_2SA$ of the carbon black is measured in accordance with JIS K6217-2:2001.

The carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of the carbon black per 100 parts by mass of the rubber components is preferably 5 parts by mass or more, more preferably 10 parts by mass or more, still more preferably 20 parts by mass or more, particularly preferably 30 parts by mass or more, but is preferably 150 parts by mass or less, more preferably 100 parts by mass or less, still more preferably 80 parts by mass or less, particularly preferably 60 parts by mass or less, most preferably 50 parts by mass or less. When the amount is within the range indicated above, the advantageous effect tends to be better achieved.

The rubber composition preferably contains silica and carbon black each in an amount of 20 parts by mass or more per 100 parts by mass of the rubber components. The rubber composition more preferably contains silica and carbon black each in an amount of 30 parts by mass or more per 100 parts by mass of the rubber components. When the amount is within the range indicated above, the advantageous effect tends to be better achieved.

The rubber composition may contain one or more oils.

Examples of the oils include process oils, plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. These may be used alone or in combinations of two or more. Preferred among these are process oils, with aromatic process oils being more preferred, because then the advantageous effect can be well achieved.

The oils may be commercially available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc.

The amount of the oils per 100 parts by mass of the rubber components is preferably 5 parts by mass or more, more preferably 10 parts by mass or more, still more preferably 20 parts by mass or more, but is preferably 50 parts by mass or less, more preferably 35 parts by mass or less. When the amount is within the range indicated above, the advantageous effect tends to be better achieved. The amount of the oils includes the amount of the oils contained in the rubbers (oil extended rubbers), if used.

The rubber composition may contain one or more resins. Any resin generally used in the tire industry may be used, and examples include rosin resins, coumarone-indene resins, α-methylstyrene resins, terpene resins, p-t-buthylphenol acetylene resins, acrylic resins, C5 resins, and C9 resins. Commercial products available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Energy Corporation, Arakawa Chemical Industries, Ltd., Taoka Chemical Co., Ltd., Toagosei Co., Ltd., etc. may be used. These may be used alone or in combinations of two or more. Preferred among these are coumarone-indene resins, α-methylstyrene resins, p-t-buthylphenol acetylene resins, C5 resins, C9 resins, and other petroleum resins, with coumarone-indene resins being more preferred.

The softening point of the resins is preferably 30° C. or higher, more preferably 60° C. or higher, still more preferably 80° C. or higher, but is preferably 200° C. or lower, more preferably 160° C. or lower, still more preferably 140° C. or lower, particularly preferably 120° C. or lower. When the softening point is within the range indicated above, the advantageous effect tends to be more suitably achieved.

Herein, the softening point of the resins is determined as set forth in JIS K 6220-1:2001 using a ring and ball softening point measuring apparatus and defined as the temperature at which the ball drops down.

The amount of the resins per 100 parts by mass of the rubber components is preferably 1 part by mass or more, more preferably 5 parts by mass or more, still more preferably 10 parts by mass or more, particularly preferably 20 parts by mass or more, most preferably 30 parts by mass or more, even most preferably 40 parts by mass or more, but is preferably 80 parts by mass or less, more preferably 60 parts by mass or less. When the amount is within the range indicated above, the advantageous effect tends to be better achieved.

The rubber composition may contain one or more waxes.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Preferred among these are petroleum waxes, with paraffin waxes being more preferred.

The waxes may be commercially available from Ouchi Shinko Chemical Industrial Co., Ltd., Nippon Seiro Co., Ltd., Seiko Chemical Co., Ltd., etc.

The amount of the waxes per 100 parts by mass of the rubber components is preferably 0.3 parts by mass or more, more preferably 0.5 parts by mass or more, but is preferably 20 parts by mass or less, more preferably 10 parts by mass or less. When the amount is within the range indicated above, the advantageous effect tends to be better achieved.

The rubber composition may contain one or more antioxidants.

Examples of the antioxidants include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Preferred among these are p-phenylenediamine or quinoline antioxidants.

The antioxidants may be commercially available from Seiko Chemical Co., Ltd., Sumitomo Chemical Co., Ltd., Ouchi Shinko Chemical Industrial Co., Ltd., Flexsys, etc.

The amount of the antioxidants per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain one or more types of stearic acid.

The stearic acid may be conventional ones, e.g., available from NOF Corporation, Kao Corporation, FUJIFILM Wako Pure Chemical Corporation, or Chiba Fatty Acid Co., Ltd.

The amount of the stearic acid per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain one or more types of zinc oxide.

The zinc oxide may be conventional ones, e.g., available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain one or more types of sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa sulfur Co., Ltd., Shikoku Chemicals Corporation, Flexsys, Nippon Kanryu Industry Co., Ltd., Hosoi Chemical Industry Co., Ltd., etc.

The amount of the sulfur per 100 parts by mass of the rubber components is preferably 0.1 parts by mass or more, more preferably 0.5 parts by mass or more, but is preferably 10 parts by mass or less, more preferably 5 parts by mass or less, still more preferably 3 parts by mass or less. When the amount is within the range indicated above, the advantageous effect tends to be better achieved.

The rubber composition may contain one or more vulcanization accelerators.

Examples of the vulcanization accelerators include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-tert-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Preferred among these are sulfenamide and/or guanidine vulcanization accelerators because then the advantageous effect can be more suitably achieved.

The vulcanization accelerators may be commercially available from Kawaguchi Chemical Industry Co., Ltd., Ouchi Shinko Chemical Industrial Co., Ltd., etc.

The amount of the vulcanization accelerators per 100 parts by mass of the rubber components is preferably 1 part by mass or more, more preferably 2 parts by mass or more, but is preferably 10 parts by mass or less, more preferably 7 parts by mass or less. When the amount is within the range indicated above, the advantageous effect tends to be better achieved.

In addition to the above-mentioned components, the rubber composition may further contain additives commonly used in the tire industry, including, for example, organic peroxides, and fillers such as calcium carbonate, talc, alumina, clay, aluminum hydroxide, and mica. The amount of each of such additives per 100 parts by mass of the rubber components is preferably 0.1 to 200 parts by mass.

The rubber composition may be prepared, for example, by kneading the components in a rubber kneading machine such as an open roll mill or Banbury mixer, and vulcanizing the kneaded mixture.

The kneading conditions are as follows: in a base kneading step of kneading additives other than vulcanizing agents and vulcanization accelerators, the kneading temperature is usually 100 to 180° C., preferably 120 to 170° C., while in a final kneading step of kneading vulcanizing agents and vulcanization accelerators, the kneading temperature is usually 120° C. or lower, preferably 80 to 110° C. The composition obtained by kneading vulcanizing agents and vulcanization accelerators is usually vulcanized by press vulcanization, for example. The vulcanization temperature is usually 140 to 190° C., preferably 150 to 185° C. The vulcanization time is usually 5 to 15 minutes.

The rubber composition may be used in tire components (i.e., as a rubber composition for tires) such as treads (cap treads), sidewalls, base treads, undertreads, shoulders, clinches, bead apexes, breaker cushion rubbers, rubbers for carcass cord topping, insulations, chafers, and innerliners, and side reinforcement layers of run-flat tires. The rubber composition is especially suitable for use in tire components which may be in contact with water (treads, sidewalls, shoulders), more suitably in treads. In the case of a tread consisting of a cap tread and a base tread, the rubber composition may be suitably used in the cap tread.

Examples of the tire components which may be in contact with water include components (treads, sidewalls, shoulders) located at the outermost surfaces of tires when new or during running where the tires are being worn.

The tire (e.g., pneumatic tire) of the present disclosure can be produced from the rubber composition by a usual method. Specifically, the unvulcanized rubber composition containing additives as needed may be extruded into the shape of a tire component (in particular, a tread (cap tread)) and then formed and assembled with other tire components in a tire building machine in a usual manner to build an unvulcanized tire, which may then be heated and pressurized in a vulcanizer to produce a tire.

It is sufficient that the tire component (e.g., tread) of the tire at least partially include the rubber composition. The whole tire component may include the rubber composition.

The tire may be suitably used as, for example, a tire for passenger vehicles, large passenger vehicles, large SUVs, trucks and buses, or two-wheeled vehicles, or as a racing tire, a winter tire (studless winter tire, snow tire, or studded tire), an all-season tire, a run-flat tire, an aircraft tire, or a mining tire.

The thickness of the tread in the tire is preferably 4 mm or more, more preferably 6 mm or more, still more preferably 8 mm or more, particularly preferably 11 mm or more. When the thickness is within the range indicated above, the advantageous effect tends to be better achieved. Moreover, the upper limit is not limited, but it is preferably 35 mm or less, more preferably 25 mm or less, still more preferably 20 mm or less, particularly preferably 15 mm or less.

The groove depth (the distance to the deepest part of the groove in the tire radial direction) of the tread in the tire is usually about 70% of the thickness of the tread and correlates with the thickness of the tread.

The tire preferably includes a tread which includes a rubber composition having a hardness that reversibly changes with water and satisfying relationships (1) and (2), and which has a thickness of 4 mm or more. Such a tire provides more suitably improved overall performance in terms of wet grip performance and dry grip performance.

The tire provides the above-mentioned effect. The reason for this advantageous effect is not exactly clear, but may be explained as follows.

As described earlier, a rubber composition having a hardness that reversibly changes with water and further satisfying relationship (1) provides an appropriate hardness depending on the water conditions on the road (wet or dry road), and therefore provides improved overall performance in terms of wet grip performance and dry grip performance. Moreover, the rubber composition of the present disclosure provides better wet grip performance and dry grip performance by satisfying relationship (2).

The thickness of the tread correlates with the groove depth. A tread having a larger thickness tends to have a greater groove depth. Hence, from the standpoint of the thickness of the tread, wet grip performance may be improved by increasing the groove depth of the tread, i.e., increasing the thickness of the tread.

Thus, increasing the thickness of the tread improves wet grip performance. The tire in which the tread formed from the rubber composition has a thickness within the predetermined range provides more suitably improved overall performance in terms of dry grip performance and wet grip performance.

Accordingly, the tire includes a tread which includes a rubber composition having a hardness that reversibly changes with water and satisfying relationships (1) and (2), and which has a thickness within the predetermined range and thus provides more suitably improved overall performance in terms of wet grip performance and dry grip performance.

Moreover, by the use of the rubber compound having a hardness that reversibly changes with water, it is possible to provide appropriate grip performance depending on the road conditions. Further, as the rubber hardness range that may be used in the tread is widened, the design flexibility of the tread can be improved.

Herein, the thickness of the tread, when consisting of a single layer, refers to the length in the tire radial direction of the part at which the width of the layer is the largest in the tire radial direction. In the case of a multilayer tread, for example, a tread having two layers: a cap tread and a base tread, the thickness of the tread refers to the length in the tire radial direction of the part at which the width of the cap tread located as an outer surface layer is the largest in the tire radial direction.

From the standpoint of dry grip performance, the land ratio of the tread in the tire is preferably 30% or higher, more preferably 40% or higher, still more preferably 50% or higher, further preferably 75% or higher. From the standpoint of wet grip performance, the upper limit is preferably 95% or lower, more preferably 90% or lower, still more preferably 85% or lower.

The tire preferably includes a tread which includes a rubber composition having a hardness that reversibly changes with water and satisfying relationships (1) and (2), and which has a land ratio of 30% or higher. Such a tire provides more suitably improved overall performance in terms of wet grip performance and dry grip performance.

The tire provides the above-mentioned effect. The reason for this advantageous effect is not exactly clear, but may be explained as follows.

As described earlier, a rubber composition having a hardness that reversibly changes with water and further satisfying relationship (1) provides an appropriate hardness depending on the water conditions on the road (wet or dry road), and therefore provides improved overall performance in terms of wet grip performance and dry grip performance. Moreover, the rubber composition of the present disclosure provides better wet grip performance and dry grip performance by satisfying relationship (2).

Moreover, a tread having a higher land ratio has improved dry grip performance, while a tread having a lower land ratio has improved wet grip performance. The tire in which the tread formed from the rubber composition has a land ratio within the predetermined range provides more suitably improved overall performance in terms of dry grip performance and wet grip performance.

Accordingly, the tire includes a tread which includes a rubber composition having a hardness that reversibly changes with water and satisfying relationships (1) and (2), and which has a land ratio within the predetermined range and thus provides more suitably improved overall performance in terms of wet grip performance and dry grip performance.

Moreover, by the use of the rubber compound having a hardness that reversibly changes with water, it is possible to provide appropriate grip performance depending on the road conditions. Further, as the rubber hardness range that may be used in the tread is widened, the design flexibility of the tread can be improved.

Herein, when the tire is a pneumatic tire, the land ratio can be calculated from the contact patch under the conditions including a normal rim, a normal internal pressure, and a normal load. When the tire is an airless tire, the land ratio can be calculated as described above, without the need of a normal internal pressure.

The term "normal rim" refers to a rim specified for each tire by the standards in a standard system including standards according to which tires are provided, and may be, for example, "standard rim" in JATMA, "design rim" in TRA, or "measuring rim" in ETRTO.

The term "normal internal pressure" refers to an air pressure specified for each tire by the above standards, and may be "maximum air pressure" in JATMA, a maximum value shown in Table "TIRE LOAD LIMITS AT VARIOUS COLD INFLATION PRESSURES" in TRA, or "inflation pressure" in ETRTO. In the case of tires for passenger vehicles, the normal internal pressure is 180 kPa.

The term "normal load" refers to a load specified for each tire by the above standards, and may be a load obtained by multiplying "maximum load capacity" in JATMA, a maximum value shown in Table "TIRE LOAD LIMITS AT VARIOUS COLD INFLATION PRESSURES" in TRA, or "load capacity" in ETRTO by 0.88.

The contact patch may be determined by mounting the tire on a normal rim, applying a normal internal pressure to the tire, and allowing the tire to stand at 25° C. for 24 hours, followed by applying black ink to the tread surface of the tire and pressing it to a cardboard at a normal load (camber angle: 0°) for transfer to the cardboard.

The transfer may be performed in five positions rotated by 72 degrees relative to one another in the tire circumferential direction. Namely, the contact patch may be determined five times.

The average of the largest lengths in the tire axial direction of the five contact patches is denoted as L, and the average of the lengths in the direction orthogonal to the axis direction thereof is denoted as W.

The land ratio is calculated from the equation:

[Average of areas of five contact patches transferred to cardboard (parts with black ink)]/(L×W)×100 (%).

Here, the average length and the average area are each a simple average of the five values.

The tread in the tire may include a groove that is continuous in the tire circumferential direction and/or a groove that is non-continuous in the tire circumferential direction. Examples of patterns with such grooves include rib, lug, rib-lug, and block patterns.

EXAMPLES

The present disclosure is specifically described with reference to, but not limited to, examples.

Production Example 1

A nitrogen-purged autoclave reactor was charged with hexane, 1,3-butadiene, styrene, tetrahydrofuran, and ethylene glycol diethyl ether. Subsequently, solutions of bis(diethylamino)methylvinylsilane and n-butyllithium in cyclohexane and n-hexane, respectively, were introduced to initiate polymerization.

Copolymerization of 1,3-butadiene and styrene was carried out for three hours at a stirring rate of 130 rpm and a temperature inside the reactor of 65° C. while continuously feeding the monomers into the reactor. Next, the resulting polymer solution was stirred at a stirring rate of 130 rpm, and N-(3-dimethylaminopropyl)acrylamide was added, followed by a reaction for 15 minutes. After completion of the polymerization reaction, 2,6-di-tert-butyl-p-cresol was added. Then, the solvents were removed by steam stripping, and the resulting product was dried on hot rolls adjusted at 110° C. to obtain a modified styrene-butadiene rubber (SBR).

(Production Example 2) Synthesis of Polymer 1

(Epoxide/Allyl Glycidyl Ether Copolymer)

A nitrogen-purged glass flask was charged with 500 mL of diethyl ether. After the internal temperature was lowered to 0° C. or lower, 10 mL of a 0.55 mol/L solution of triisobutylaluminum in hexane was added, and then a 0.55 mol/L ethanol/diethyl ether solution was dropwise added while ensuring that the internal temperature did not exceed 10° C. Subsequently, a solution prepared by mixing 200 g in total of ethylene oxide and allyl glycidyl ether in a molar ratio of 9:1 was dropwise added while ensuring that the internal temperature did not exceed 10° C., followed by stirring for eight hours. Next, the solvents were evaporated under reduced pressure at an external temperature of 50° C. and an internal pressure of 1.0 kPa or less, and then the residue was suspended in water and filtered. The filtration residue was washed with THF and then dried under reduced pressure at 50° C. and 1 kPa or less until it reached a constant weight, thereby obtaining Polymer 1 (the infrared absorption spectrum showed ether and carbon-carbon peaks derived from formula (A) and formula (B), respectively; the weight average molecular weight (Mw) was 780,000; and the amount of the group (structural unit) of formula (B) based on 100 mol % of the polymer was 8 mol %) at a yield of 80%.

(Production Example 3) Synthesis of Polymer 2
(Amine/Allyl Glycidyl Ether Copolymer)

By following the procedure of Production Example 2, but replacing the ethylene oxide with triglycidyl amine, a polymer of triglycidyl amine and allyl glycidyl ether was obtained as Polymer 2 (the same analysis as in Production Example 2 showed amine absorption and carbon-carbon double bond peaks; the weight average molecular weight was 980,000; and the amount of the group (structural unit) of formula (B) based on 100 mol % of the polymer was 8 mol %) at a yield of 80%.

(Production Example 4) Synthesis of Polymer 3
(Silyl/Allyl Glycidyl Ether Copolymer)

By following the procedure of Production Example 2, but replacing the ethylene oxide with triethoxysilyl glycidyl ether, a polymer of triethoxysilyl glycidyl ether and allyl glycidyl ether was obtained as Polymer 3 (the same analysis as in Production Example 2 showed silanol absorption and carbon-carbon double bond peaks; the weight average molecular weight was 640,000; and the amount of the group (structural unit) of formula (B) based on 100 mol % of the polymer was 8 mol %) at a yield of 80%.

Moreover, the Polymers 1 to 3 were evaluated as described below.

<Measurement of Water-Insolubles>

An amount of 1 g of each polymer was weighed in a glass flask, and 10 mL of water was poured therein, followed by stirring at an internal temperature of 66° C. for 10 minutes. Then, stirring was continued until the internal temperature reached 25° C. or lower. The resulting mixture was filtered through a filter paper made of cellulose with a mesh size of 5 C. After the residue left on the filter paper was dried at a temperature of 80° C. and an internal pressure of 0.1 kPa or less for eight hours, the weight of the dried residue was measured. The amount of water-insolubles was determined using the following equation.

Amount of water-insolubles (% by mass)=Weight (g) of dried residue/Initial weight (g) of polymer× 100

<Measurement of THF-Insolubles>

An amount of 1 g of each polymer was weighed in a glass flask, and 10 mL of tetrahydrofuran was poured therein, followed by stirring at an internal temperature of 66° C. for 10 minutes. Then, stirring was continued until the internal temperature reached 25° C. or lower. The resulting mixture was filtered through a filter paper made of cellulose with a mesh size of 5 C. After the residue left on the filter paper was dried at a temperature of 80° C. and an internal pressure of 0.1 kPa or less for eight hours, the weight of the dried residue was measured. The amount of THF-insolubles was determined using the following equation.

Amount of THF-insolubles (% by mass)=Weight (g) of dried residue/Initial weight (g) of polymer× 100

The chemicals used in the examples and comparative example are listed below.

SBR: SBR synthesized as described above (modified S-SBR, styrene content: 25% by mass, vinyl content: 59 mol %, not extended with oil)
BR: BR150B (cis content: 97% by mass) available from Ube Industries, Ltd.
NR: TSR20
Polymer 1: Polymer 1 synthesized as described above (water-insolubles: 96% by mass, THF-insolubles: 96% by mass)
Polymer 2: Polymer 2 synthesized as described above (water-insolubles: 82% by mass, THF-insolubles: 96% by mass)
Polymer 3: Polymer 3 synthesized as described above (water-insolubles: 92% by mass, THF-insolubles: 92% by mass)
Silica: ZEOSIL 1165MP ($N_2SA$: 160 $m^2/g$) available from Rhodia
Carbon black: Seast 9H (DBP oil absorption: 115 mL/100 g, $N_2SA$: 110 $m^2/g$) available from Tokai Carbon Co., Ltd.
Silane coupling agent: Si75 (bis(3-triethoxysilyl-propyl) disulfide) available from Evonik Degussa
Oil: Process X-140 (aromatic process oil) available from Japan Energy Corporation
Resin: G90 (coumarone-indene resin, softening point: 90° C.) available from Nitto Chemical Co., Ltd.
Wax: Ozoace 0355 available from Nippon Seiro Co., Ltd.
Antioxidant: Santoflex 13 (N-(1,3-dimethylbutyl)-N'-phenyl-p-phenylenediamine, 6PPD) available from Flexsys
Stearic acid: stearic acid "TSUBAKI" available from NOF Corporation
Zinc oxide: zinc oxide #2 available from Mitsui Mining & Smelting Co., Ltd.
Sulfur: powdered sulfur available from Tsurumi Chemical Industry Co., Ltd.
Vulcanization accelerator 1: NOCCELER NS (N-tert-butyl-2-benzothiazolylsulfenamide) available from Ouchi Shinko Chemical Industrial Co., Ltd.
Vulcanization accelerator 2: NOCCELER D (1,3-diphenylguanidine) available from Ouchi Shinko Chemical Industrial Co., Ltd.

Examples and Comparative Example

According to each formulation shown in Table 1, the chemicals other than the sulfur and vulcanization accelerators were kneaded using a 1.7 L Banbury mixer (Kobe Steel, Ltd.) at 160° C. for four minutes to give a kneaded mixture. Then, the kneaded mixture was kneaded with the sulfur and vulcanization accelerators in an open roll mill at 80° C. for four minutes to give an unvulcanized rubber composition.

The unvulcanized rubber composition was press-vulcanized at 170° C. for 12 minutes to give a vulcanized rubber composition.

The vulcanized rubber compositions prepared as above were evaluated as described below. Table 1 shows the results.

(Hardness (Hs) of Vulcanized Rubber)

The shore hardness (Hs, JIS-A hardness) of the vulcanized rubber compositions (test specimens) was measured using a type A durometer in accordance with JIS K6253-3 (2012) "Rubber, vulcanized or thermoplastic—Determination of hardness—Part 3: Durometer method". The measurement was carried out at 25° C.

(Hardness when Water-Wet)

The vulcanized rubber compositions (having a rectangular parallelepiped shape of 30 mm×30 mm×4 mm) were immersed in 20 mL of water at 25° C. for six hours to give water-wet vulcanized rubber compositions. The hardness of the water-wet vulcanized rubber compositions was determined as described above and reported as the hardness when water-wet.

(Hardness when Dry)

The water-wet vulcanized rubber compositions were dried under reduced pressure at 80° C. and 1 kPa or less until they reached a constant weight, thereby obtaining dried vulcanized rubber compositions. After the temperature of the dried vulcanized rubber compositions was returned to 25° C., the hardness of the dried vulcanized rubber compositions was determined as described above and reported as the hardness when dry.

(Hardness when Re-Wet with Water)

The dried vulcanized rubber compositions (having a rectangular parallelepiped shape of 30 mm×30 mm×4 mm) were immersed in 20 mL of water at 25° C. for six hours to give vulcanized rubber compositions re-wet with water. The hardness of the vulcanized rubber compositions re-wet with water was determined as described above and reported as the hardness when re-wet with water.

(Tan δ when Dry)

The tan δ at 70° C. of the dried vulcanized rubber compositions was measured using a viscoelastic spectrometer VES (Iwamoto Seisakusho Co., Ltd.). The measurement conditions were as follows: a measurement temperature of 70° C., an initial strain of 10%, a dynamic strain of 2%, and a frequency of 10 Hz.

(Wet Grip Performance Index)

Each unvulcanized rubber composition sheet was formed into a tread shape and assembled with other tire components, followed by press-vulcanization at 150° C. for 15 minutes to prepare a kart tire (tire size: 11×1.10-5). Each set of kart tires were mounted on a kart. A test driver drove the kart eight laps around a test track of 2 km per lap in which the road surface was previously sprinkled with water. Then, the driver rated the grip performance on a scale of 1 to 200 (best), where the grip performance of Comparative Example 1 was set equal to 100.

(Dry Grip Performance Index)

Each unvulcanized rubber composition sheet was formed into a tread shape and assembled with other tire components, followed by press-vulcanization at 150° C. for 15 minutes to prepare a kart tire (tire size: 11×1.10-5). Each set of kart tires were mounted on a kart. A test driver drove the kart eight laps around a test track of 2 km per lap under dry road conditions. Then, the driver rated the grip performance on a scale of 1 to 200 (best), where the grip performance of Comparative Example 1 was set equal to 100.

components, followed by press-vulcanization at 170° C. for 12 minutes to prepare a test tire (size: 195/65R15).

(Wet Grip Performance Index)

Each set of test tires were mounted on a car. A test driver drove the car eight laps around a test track of 2 km per lap in which the road surface was previously sprinkled with water. Then, the driver rated the grip performance on a scale of 1 to 200 (best), where the grip performance of Example 2-1 was set equal to 100. Table 2 shows the results.

(Dry Grip Performance Index)

Each set of test tires were mounted on a car. A test driver drove the car eight laps around a test track of 2 km per lap under dry road conditions. Then, the driver rated the grip performance on a scale of 1 to 200 (best), where the grip performance of Example 2-1 was set equal to 100. Table 2 shows the results.

TABLE 1

| | | Comparative Example | Example | | | | | | | | | | | | | | |
|---|---|---|---|---|---|---|---|---|---|---|---|---|---|---|---|---|---|
| | | 1 | 1 | 2 | 3 | 4 | 5 | 6 | 7 | 8 | 9 | 10 | 11 | 12 | 13 | 14 | 15 |
| Amount (parts by mass) | SBR | 70 | 70 | 70 | 70 | 70 | 70 | 70 | 70 | 70 | 70 | 70 | 70 | 70 | 70 | 70 | 70 |
| | BR | 20 | 20 | 20 | 20 | 20 | 20 | 20 | 20 | 20 | 20 | 20 | 20 | 20 | 20 | 20 | 20 |
| | NR | 10 | 10 | 10 | 10 | 10 | 10 | 10 | 10 | 10 | 10 | 10 | 10 | 10 | 10 | 10 | 10 |
| | Polymer 1 | — | 5 | 11 | 21 | 31 | 41 | 41 | 51 | 61 | 71 | 81 | 91 | 101 | 111 | — | — |
| | Polymer 2 | — | — | — | — | — | — | — | — | — | — | — | — | — | — | 41 | — |
| | Polymer 3 | — | — | — | — | — | — | — | — | — | — | — | — | — | — | — | 41 |
| | Silica | 30 | 30 | 30 | 30 | 30 | 30 | 40 | 45 | 45 | 45 | 50 | 60 | 70 | 80 | 40 | 40 |
| | Carbon black | 36 | 36 | 36 | 36 | 36 | 36 | 36 | 36 | 36 | 36 | 36 | 36 | 36 | 36 | 36 | 36 |
| | Resin | — | — | 2 | 4 | 8 | 10 | — | 10 | 15 | 20 | 20 | 30 | 40 | 50 | — | — |
| | Silane coupling agent | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 | 1.6 |
| | Oil | 25 | 25 | 25 | 25 | 25 | 25 | 25 | 25 | 25 | 25 | 25 | 25 | 25 | 25 | 25 | 25 |
| | Wax | 2 | 2 | 2 | 2 | 2 | 2 | 2 | 2 | 2 | 2 | 2 | 2 | 2 | 2 | 2 | 2 |
| | Antioxidant | 2 | 2 | 2 | 2 | 2 | 2 | 2 | 2 | 2 | 2 | 2 | 2 | 2 | 2 | 2 | 2 |
| | Stearic acid | 2 | 2 | 2 | 2 | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Sulfur | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 |
| | Vulcanization accelerator 1 | 2 | 2 | 2 | 2 | 2 | 2 | 2 | 2 | 2 | 2 | 2 | 2 | 2 | 2 | 1 | 1 |
| | Vulcanization accelerator 2 | 1.4 | 1.4 | 1.4 | 1.4 | 1.4 | 1.4 | 1.4 | 1.4 | 1.4 | 1.4 | 1.4 | 1.4 | 1.4 | 1.4 | 2 | 2 |
| Evaluation result | Hardness of vulcanized rubber | 64 | 64 | 64 | 64 | 64 | 62 | 64 | 64 | 64 | 64 | 64 | 64 | 64 | 64 | 65 | 66 |
| | Hardness when water-wet (Hs (Wet)) | 64 | 62 | 61 | 60 | 59 | 56 | 56 | 55 | 53 | 51 | 49 | 46 | 43 | 40 | 55 | 56 |
| | Hardness when dry | 64 | 64 | 64 | 64 | 64 | 62 | 64 | 64 | 64 | 64 | 64 | 64 | 64 | 64 | 65 | 66 |
| | Grip index, Hardness when dry-Hs (Wet) | 0 | 2 | 3 | 4 | 5 | 6 | 8 | 9 | 11 | 13 | 15 | 18 | 21 | 24 | 10 | 10 |
| | Hardness when re-wet with water | 60 | 62 | 61 | 60 | 59 | 56 | 56 | 55 | 53 | 51 | 49 | 46 | 43 | 40 | 55 | 56 |
| | tan δ when dry | 0.20 | 0.18 | 0.19 | 0.20 | 0.21 | 0.21 | 0.19 | 0.21 | 0.20 | 0.21 | 0.22 | 0.22 | 0.23 | 0.23 | 0.19 | 0.19 |
| | Wet grip performance index | 100 | 101 | 102 | 104 | 105 | 107 | 107 | 110 | 110 | 111 | 114 | 116 | 118 | 120 | 114 | 117 |
| | Dry grip performance index | 100 | 100 | 100 | 101 | 106 | 103 | 102 | 104 | 105 | 106 | 108 | 109 | 110 | 111 | 109 | 109 |

The results in Table 1 show that the examples which had a hardness that reversibly changes with water and satisfied relationships (1) and (2) exhibited improved overall performance in terms of wet grip performance and dry grip performance (as shown by the sum of the two indexes of wet grip performance and dry grip performance).

(Production of Tire)

The unvulcanized rubber compositions prepared as above were formed into a tread shape (having a tread thickness shown in Table 2) and then assembled with other tire

TABLE 2

| | | Example | | | | |
|---|---|---|---|---|---|---|
| | | 2-1 | 2-2 | 2-3 | 2-4 | 2-5 |
| Formulation | | Example 13 in Table 1 | | | | |
| Tread thickness (mm) | | 3 | 4 | 11 | 15 | 20 |
| Evaluation | Wet grip performance index | 100 | 101 | 105 | 107 | 108 |

TABLE 2-continued

|  | Example | | | | |
| --- | --- | --- | --- | --- | --- |
|  | 2-1 | 2-2 | 2-3 | 2-4 | 2-5 |
| Dry grip performance index | 100 | 103 | 105 | 106 | 105 |

The results in Table 2 show that the tires having a tread which included a rubber composition having a hardness that reversibly changes with water and satisfying relationships (1) and (2), and which had a thickness of 4 mm or more exhibited more suitably improved overall performance in terms of wet grip performance and dry grip performance (as shown by the sum of the two indexes of wet grip performance and dry grip performance).

(Production of Tire)

The unvulcanized rubber compositions prepared as above were formed into a tread shape (having a land ratio shown in Table 3) and then assembled with other tire components, followed by press-vulcanization at 170° C. for 12 minutes to prepare a test tire (size: 195/65R15).

(Measurement of Land Ratio) The land ratio (%) was measured using the JATMA standards according to the method for measuring the land ratio described herein. Table 3 shows the results.

(Wet Grip Performance Index)

Each set of test tires were mounted on a car. A test driver drove the car eight laps around a test track of 2 km per lap in which the road surface was previously sprinkled with water. Then, the driver rated the grip performance on a scale of 1 to 200 (best), where the grip performance of Example 3-1 was set equal to 100. Table 3 shows the results.

(Dry Grip Performance Index)

Each set of test tires were mounted on a car. A test driver drove the car eight laps around a test track of 2 km per lap under dry road conditions. Then, the driver rated the grip performance on a scale of 1 to 200 (best), where the grip performance of Example 3-1 was set equal to 100. Table 3 shows the results.

TABLE 3

|  |  | Example | | | | |
| --- | --- | --- | --- | --- | --- | --- |
|  |  | 3-1 | 3-2 | 3-3 | 3-4 | 3-5 |
| Formulation | | Example 13 in Table 1 | | | | |
| Land ratio (%) | | 25 | 31 | 50 | 76 | 85 |
| Evaluation | Wet grip performance index | 100 | 104 | 109 | 113 | 112 |
|  | Dry grip performance index | 100 | 103 | 108 | 114 | 118 |

The results in Table 3 show that the tires having a tread which included a rubber composition having a hardness that reversibly changes with water and satisfying relationships (1) and (2), and which had a land ratio of 30% or higher exhibited more suitably improved overall performance in terms of wet grip performance and dry grip performance (as shown by the sum of the two indexes of wet grip performance and dry grip performance).

The invention claimed is:

1. A rubber composition, having a hardness that reversibly changes with water and satisfying the following relationships (1) and (2):

Hardness when dry−Hardness when water-wet≥1    (1)

wherein each hardness represents a JIS-A hardness at 25° C. of the rubber composition; and tan δ at 70° C. when dry≥0.18    (2)

wherein the tan δ at 70° C. represents a loss tangent measured at 70° C., an initial strain of 10%, a dynamic strain of 2%, and a frequency of 10 Hz.

2. The rubber composition according to claim 1, wherein the value of "Hardness when dry−Hardness when water-wet" in relationship (1) is 4 or more.

3. The rubber composition according to claim 1, wherein the value of "tan δ at 70° C. when dry" in relationship (2) is 0.21 or more.

4. The rubber composition according to claim 1, comprising at least one hydrophilic material.

5. The rubber composition according to claim 1, comprising at least one isoprene-based rubber.

6. The rubber composition according to claim 1, comprising at least one polybutadiene rubber.

7. The rubber composition according to claim 1, wherein the rubber composition has a styrene-butadiene rubber content of 95% by mass or lower based on 100% by mass of the at least one rubber component in the rubber composition.

8. The rubber composition according to claim 1, satisfying the following relationship:

Styrene-butadiene rubber content based on 100% by mass of rubber components>50% by mass>Polybutadiene rubber content based on 100% by mass of rubber components>Isoprene-based rubber content based on 100% by mass of rubber components.

9. The rubber composition according to claim 1, wherein the rubber composition comprises silica and carbon black each in an amount of 20 parts by mass or more per 100 parts by mass of the at least one rubber component in the rubber composition.

10. The rubber composition according to claim 1, comprising at least one petroleum resin.

11. The rubber composition according to claim 1, which is for use in a tread.

12. A tire, comprising a tire component at least partially comprising the rubber composition according to claim 1.

13. The tire according to claim 12, wherein the tire component is a tread, and the tread has a thickness of 4 mm or more.

14. The tire according to claim 12, wherein the tire component is a tread, and the tread has a land ratio of 30% or higher.

15. The tire according to claim 12, wherein the tire component is a tread, and the tread comprises at least one of a groove that is continuous in a tire circumferential direction or a groove that is non-continuous in the tire circumferential direction.

* * * * *